(12) United States Patent
Canter et al.

(10) Patent No.: US 8,782,315 B2
(45) Date of Patent: Jul. 15, 2014

(54) EXPANSION CARD CONTROLLER FOR CONTROLLING A RADIO SYSTEM

(75) Inventors: Jeffrey B. Canter, West Orange, NJ (US); Boris Radovcic, Rockaway, NJ (US); Michael Christoff, North Whippany, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 158 days.

(21) Appl. No.: 13/464,249

(22) Filed: May 4, 2012

(65) Prior Publication Data

US 2012/0290758 A1 Nov. 15, 2012

Related U.S. Application Data

(60) Provisional application No. 61/484,414, filed on May 10, 2011.

(51) Int. Cl.
*G06F 13/14* (2006.01)

(52) U.S. Cl.
USPC ........... 710/301; 710/306; 710/312; 710/313; 710/315

(58) Field of Classification Search
USPC ....................................... 710/301
See application file for complete search history.

(56) References Cited

U.S. PATENT DOCUMENTS

| | | | | |
|---|---|---|---|---|
| 7,245,927 B2 * | 7/2007 | Hansen | | 455/461 |
| 7,509,141 B1 * | 3/2009 | Koenck et al. | | 455/552.1 |
| 7,716,720 B1 * | 5/2010 | Marek et al. | | 726/2 |
| 7,733,125 B2 * | 6/2010 | Murotake | | 326/47 |
| 7,734,933 B1 * | 6/2010 | Marek et al. | | 713/193 |
| 7,761,904 B2 * | 7/2010 | Hessel et al. | | 726/2 |
| 7,765,399 B2 * | 7/2010 | O'Brien | | 713/164 |
| 7,839,169 B2 * | 11/2010 | Murotake | | 326/47 |
| 8,208,517 B2 * | 6/2012 | Souissi et al. | | 375/220 |
| 8,208,958 B2 * | 6/2012 | Tom | | 455/556.1 |
| 2003/0177245 A1 * | 9/2003 | Hansen | | 709/228 |
| 2004/0064720 A1 * | 4/2004 | Hessel et al. | | 713/200 |
| 2004/0196977 A1 * | 10/2004 | Johnson et al. | | 380/270 |
| 2006/0015674 A1 * | 1/2006 | Murotake | | 711/101 |
| 2007/0036358 A1 * | 2/2007 | Nguyen et al. | | 380/270 |
| 2007/0178946 A1 * | 8/2007 | Palum et al. | | 455/574 |
| 2007/0199046 A1 * | 8/2007 | O'Brien | | 726/2 |
| 2007/0223689 A1 * | 9/2007 | O'Brien et al. | | 380/30 |
| 2008/0201505 A1 * | 8/2008 | Monroe | | 710/65 |
| 2008/0278197 A1 * | 11/2008 | Murotake | | 326/38 |
| 2009/0170444 A1 * | 7/2009 | Retnasothie et al. | | 455/73 |
| 2009/0264148 A1 * | 10/2009 | Tom | | 455/550.1 |
| 2010/0115108 A1 * | 5/2010 | Wang et al. | | 709/228 |
| 2010/0138824 A1 * | 6/2010 | Cho et al. | | 717/174 |
| 2010/0244896 A1 * | 9/2010 | Murotake | | 326/41 |
| 2011/0096487 A1 * | 4/2011 | Wang | | 361/679.21 |

FOREIGN PATENT DOCUMENTS

WO    WO 2004008719 A2 *    1/2004

* cited by examiner

*Primary Examiner* — Ryan Stiglic
(74) *Attorney, Agent, or Firm* — Maine Cernota & Rardin; David A. Rardin

(57) ABSTRACT

An expansion card and method for controlling a radio system integrates PCDD operations into a PCMCIA or ExpressCard which can be inserted into an external display, smart screen PCMCIA slot, or laptop ExpressCard or PCMCIA slot to allow an operator to control the radio system with a computer without any modification of the computer.

19 Claims, 5 Drawing Sheets

EXPANSION CONTROLLER CARD SCHEMATIC

PCMCIA CARD EMBODIMENT

EXPRESSCARD EMBODIMENT

EXPANSION CONTROLLER CARD SYSTEM ENVIRONMENT

FLOW CHART

US 8,782,315 B2

EXPANSION CARD CONTROLLER FOR CONTROLLING A RADIO SYSTEM

STATEMENT OF GOVERNMENT INTEREST

The invention claimed in this patent application was made with U.S. Government support under contract no. DAAB07-02-C-C403 awarded by the Defense Contract Management Agency. The U.S. Government has certain rights in the invention.

RELATED APPLICATION

This application claims the benefit of U.S. Provisional Application No. 61/484,414 filed on 10 May, 2011, incorporated herein by reference in its entirety for all purposes.

FIELD OF THE INVENTION

The invention relates to radio systems and more particularly to a device and method for controlling radio systems.

BACKGROUND OF THE INVENTION

Ground Mobile Radio (GMR) radios are controlled by Portable Control Display Devices (PCDD). However, these are not usable in certain platforms where either the PCDD screen or the operator's environment is too small. These platforms have ruggedized laptops, "Smart Screens" or other mission computers, which are used for platform control. Size, weight, and power (SWAP) versus performance requirements impose significant demands on devices for field applications. Vehicle electronics have SWAP limitations and impose additional shock and vibration demands.

Balancing ruggedization requirements with common interfaces, security, and the desire to use commercial off the shelf (COTS) technology has proven difficult. Reliability demands also require operation at extreme temperature, humidity, and vibration environmental parameters.

What is needed is an improved method for controlling GMR radios.

SUMMARY OF THE INVENTION

According to embodiments of the present invention, the Portable Control Display Device (PCDD) hardware, software and security features are built into an expansion card such as a Personal Computer Memory Card International Association (PCMCIA) card or ExpressCard which can be inserted into the laptop or Smart Screen PCMCIA or ExpressCard slot, and allow the operator to control a GMR radio with an existing computer without additional modification.

An embodiment provides an expansion card device for controlling a radio system comprising a substrate; an expansion controller card interface connector on the substrate for insertion in a radio controller; an encryption Crypto Ignition Key (CIK) interface component on the substrate; a zeroize control component on the substrate; an Ethernet interface component on the substrate; an Ethernet magnetics component on the substrate, in communication with the Ethernet interface component; an Ethernet transceiver component on the substrate, interfaced with the Ethernet magnetics component; a server and interface microprocessor component on the substrate, in communication with the expansion card interface connector; a Field-Programmable Gate Array (FPGA) on the substrate; a multiplexer on the FPGA; a multiplexer/expansion card interface connector interface component within the FPGA, in communication with the multiplexer and the server and interface microprocessor component; a response control (RSP) interface component within the FPGA in communication with the response control component and the multiplexer; a zeroize control interface component within the FPGA in communication with the zeroize control component and the multiplexer; an I2C µC interface component within the FPGA in communication with the I2C µC component and the multiplexer; a multiplexer/Ethernet interface component within the FPGA, in communication with the Ethernet transceiver component and the multiplexer. Additional embodiments provide an expansion card device for controlling a radio system comprising a substrate; an expansion controller card interface connector on the substrate for insertion in a radio controller; an encryption Crypto Ignition Key (CIK) interface component on the substrate; a Red Switch Processor (RSP) Acknowledgement button on the substrate; a zeroize control component on the substrate; an Ethernet interface component on the substrate; an Ethernet magnetics component on the substrate, in communication with the Ethernet interface component; an Ethernet transceiver component on the substrate, interfaced with the Ethernet magnetics component; an Inter-Integrated Circuit (I2C) microcontroller (I2C µC) component on the substrate, in communication with the Crypto Ignition key interface component; a server and interface microprocessor component on the substrate, in communication with the expansion card interface connector; a Field-Programmable Gate Array (FPGA) on the substrate; a multiplexer on the FPGA; a multiplexer/expansion card interface connector interface component within the FPGA, in communication with the multiplexer and the server and interface microprocessor component; a response control (RSP) interface component within the FPGA in communication with the response control component and the multiplexer; a zeroize control interface component within the FPGA in communication with the zeroize control component and the multiplexer; an I2C µC interface component within the FPGA in communication with the I2C µC component and the multiplexer; a multiplexer/Ethernet interface component within the FPGA, in communication with the Ethernet transceiver component and the multiplexer; whereby separation of hardware functionality embodied in the RSP acknowledgement, the zeroize switch and the multiplexer provides all security for the radio system. In another embodiment, the expansion controller card interface connector is a Personal Computer Memory Card International Association (PCMCIA) connector, and the server and interface microprocessor component is a PCMCIA interface. In continuing embodiments, the expansion controller card interface connector is an ExpressCard connector, and the server and interface microprocessor component is an ExpressCard interface. In still other embodiments, the radio controller receiving the expansion controller card is a Panasonic Toughbook 31. For subsequent embodiments, the radio controller receiving the expansion controller card is a General Dynamics SDU11-3. In ongoing embodiments, the Ethernet transceiver comprises a Phyter DP83848. For a further embodiment, the I2C microcontroller comprises a Freescale MC9S08. In following embodiments, the CIK comprises a Datakey IIT series serial memory token interface. For additional embodiments, the expansion controller card provides required hardware and software necessary to control a ground mobile radio (GMR). Other embodiments include a Red Switch Processor (RSP) Acknowledgement button on the substrate; an Inter-Integrated Circuit (I2C) microcontroller (I2C µC) component on the substrate, in communication with the Crypto Ignition key interface component; a Red Switch Policy response control (RSP) interface component within the FPGA in communication with the response control component and the multiplexer; and an I2C µC interface component within the FPGA in communication with the I2C µC component and the multiplexer; whereby separation of hardware functionality embodied in the RSP acknowledgement, the zeroize switch and the multiplexer provides all security for the radio system. In still further embodiments, the radio controller comprises a laptop computer. For yet other embodiments, the radio controller comprises a tablet computer. Still other embodiments include that the radio controller comprises a personal digital assistant (PDA). In continuing embodiments, the radio controller comprises at least one ground mobile radio (GMR) platform computer. For another given embodiment, the radio system comprises air, ground, and sea platforms. In another embodiment, the multiplexer comprises a ground mobile radio (GMR) High Assurance Multiplexer (HAMUX). In embodiments, the CIK is connected to internal components by a 2 wire interface, or a serial interface, or similar interface.

Other embodiments provide a method for controlling a radio system comprising the steps of providing at least one expansion controller card; configuring the card for a receiving device; inserting the card into expansion card slot of the device; inserting a Crypto Ignition Key (CIK) into the card; connecting the card to an Ethernet connection on a Ground Mobile Radio (GMR); initiating a browser instance on the device; defining a radio configuration on the device by the card; selecting radio operating parameters for the configuration; and operating the radio controlled by the card and the device. In continuing embodiments, the step of providing comprises selecting a type of the expansion controller card from a Personal Computer Memory Card International Association (PCMCIA) and an ExpressCard interface. Still other embodiments comprise controlling at least one ground mobile radio (GMR) platform computer. Another embodiment further comprises providing a CIK for the card. In yet another embodiment, the step of inserting the expansion controller card provides required hardware and software necessary to control the GMR radio.

Further embodiments provide a radio system for a ground mobile radio (GMR) platform computer comprising an expansion card device for controlling the radio system comprising a substrate; an expansion controller card interface connector on the substrate for insertion in a radio controller; a Datakey IIT series serial memory token Crypto Ignition Key (CIK) interface component on the substrate; a Red Switch Policy (RSP) Acknowledgement button control component on the substrate; a zeroize control component on the substrate; an Ethernet interface component on the substrate; an Ethernet magnetics component on the substrate, in communication with the Ethernet interface component; a Phyter DP83848 Ethernet transceiver component on the substrate, interfaced with the Ethernet magnetics component; a Freescale MC9S08 Inter-Integrated Circuit (I2C) microcontroller (I2C µC) component on the substrate, in communication with the encryption key interface component; a server and interface microprocessor component on the substrate, in communication with the expansion card interface connector; a Field-Programmable Gate Array (FPGA) on the substrate; a multiplexer on the FPGA; a multiplexer/expansion card interface connector interface component within the FPGA, in communication with the multiplexer and the server and interface microprocessor component; a Red Switch Policy control (RSP) interface component within the FPGA in communication with the response control component and the multiplexer; a zeroize control interface component within the FPGA in communication with the zeroize control component and the multiplexer; an I2C µC interface component within the FPGA in communication with the I2C µC component and the multiplexer; a multiplexer/Ethernet interface component within the FPGA, in communication with the Ethernet transceiver component and the multiplexer; whereby separation of hardware functionality embodied in the RSP acknowledgement, the zeroize switch and the multiplexer provides all security for the radio system.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The following detailed description provides example embodiments of the presently claimed invention with references to the accompanying drawings. The description is intended to be illustrative and not limiting the scope of the present invention. Embodiments are described in sufficient detail to enable one of ordinary skill in the art to practice the subject invention. Other embodiments may be practiced with some variations without departing from the spirit or scope of the subject invention.

Embodiments of the invention comprise PCMCIA/ExpressCard (hereafter called "expansion card") versions of the controller interface card which is part of the Ground Mobile Radio (GMR) Portable Control Display Device (PCDD). PCDD examples include the Talla-Tech R-PDA-57. In embodiments, the GMR PCDD is the controller for the GMR radio, and is used with every radio in the system. There are several platforms (Abrams, Stryker, etc.) where even the small dimensions of a PCDD (a PDA sized device) cannot fit. Many of these platforms are outfitted with General Dynamics Smart Display Unit (SDU) SDU11-3 (which has a PCMCIA interface) or a laptop such as the Panasonic Toughbook 31 (which has an ExpessCard interface). Insertion of the controller card into the expansion slot of the mission computer provides the hardware and software necessary to control a GMR radio. The mission computer only needs to contain a standard Internet browser. For embodiments, the separation of the hardware functionality embodied in the Red Switch Policy (RSP) Acknowledgement switch and zeroize switch and multiplexer meets all security requirements presently levied on the PCDD in GMR. In GMR embodiments, the multiplexer is a High Assurance Multiplexer (HAMUX). The Red Switch Acknowledgement embodiment is part of the GMR radio Red Switch which supports the Defense Red Switch Network (DRSN). While embodiments are disclosed for the above configurations, embodiments of the controller work in any computer with an expansion slot.

The method of this invention allows calibration to be accomplished with reduced time and cost, improved repeatability and with support for periodic updates.

Figure 1:
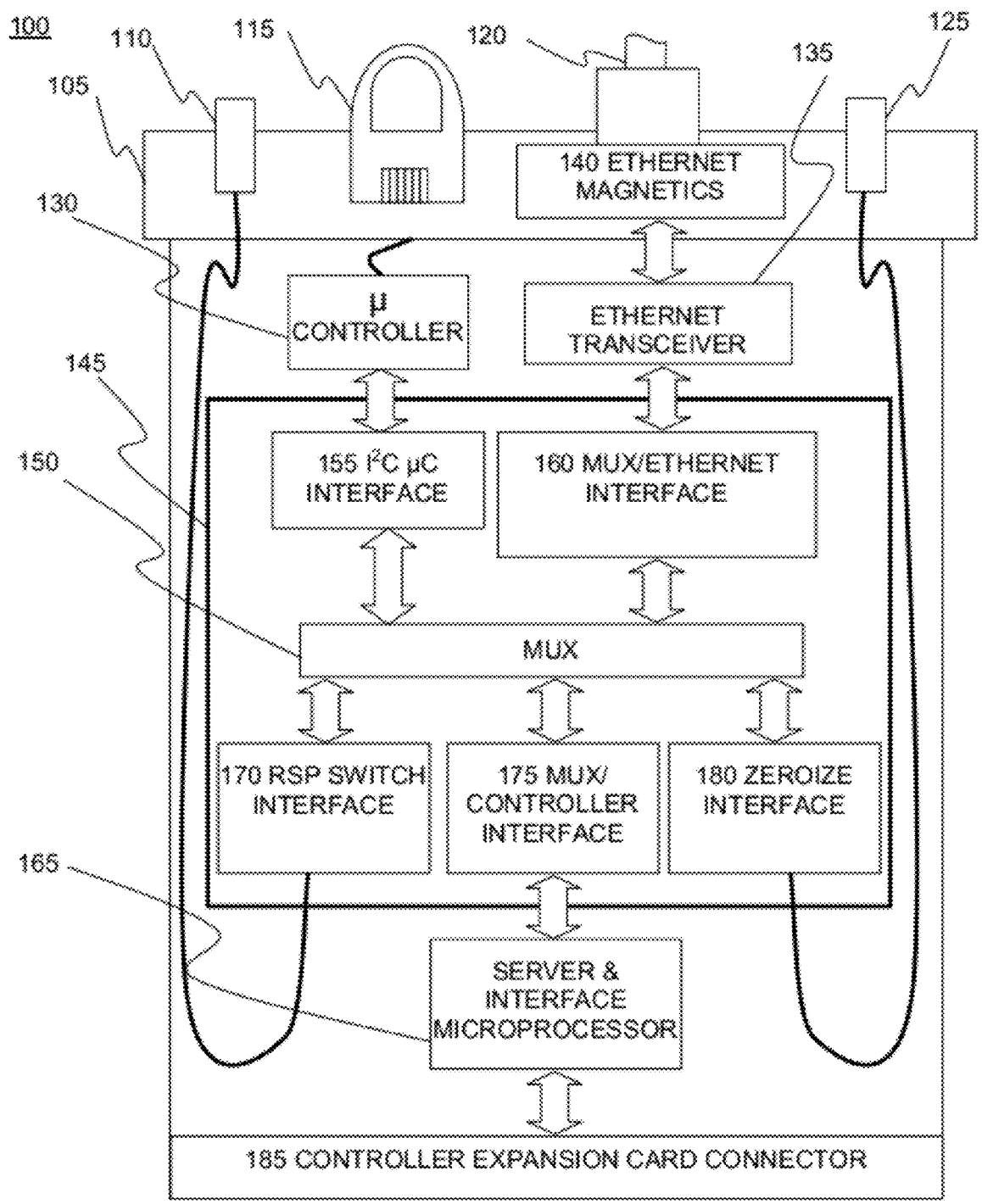
FIG. 1 is a schematic drawing showing a layout of an expansion controller card configured in accordance with an embodiment of the present invention.

FIG. 1 depicts a schematic drawing showing a layout of expansion card controller 100. The expansion card comprises external component housing/substrate 105; RSP response push-button 110, crypto ignition key (CIK) 115; Ethernet cable to network interface unit (NIU) 120; zeroize dual action switch 125; Inter-Integrated Circuit (I²C) microcontroller interface (I²C μC) 130; Ethernet transceiver 135; Ethernet magnetics 140, providing distortionless EMI suppression; Field-Programmable Gate Array (FPGA) 145; multiplexer 150; Inter-Integrated Circuit (I²C) microcontroller interface (I²C μC) 155; multiplexer/Ethernet interface 160; Ethernet server and interface microprocessor 165; RSP switch interface 170; multiplexer/controller interface 175; zeroize interface 180; and controller expansion card connector 185. An ASIC is employed for some embodiments; in others, the invention is embodied in software on a separate microprocessor (re-certification involved).

Figure 2:
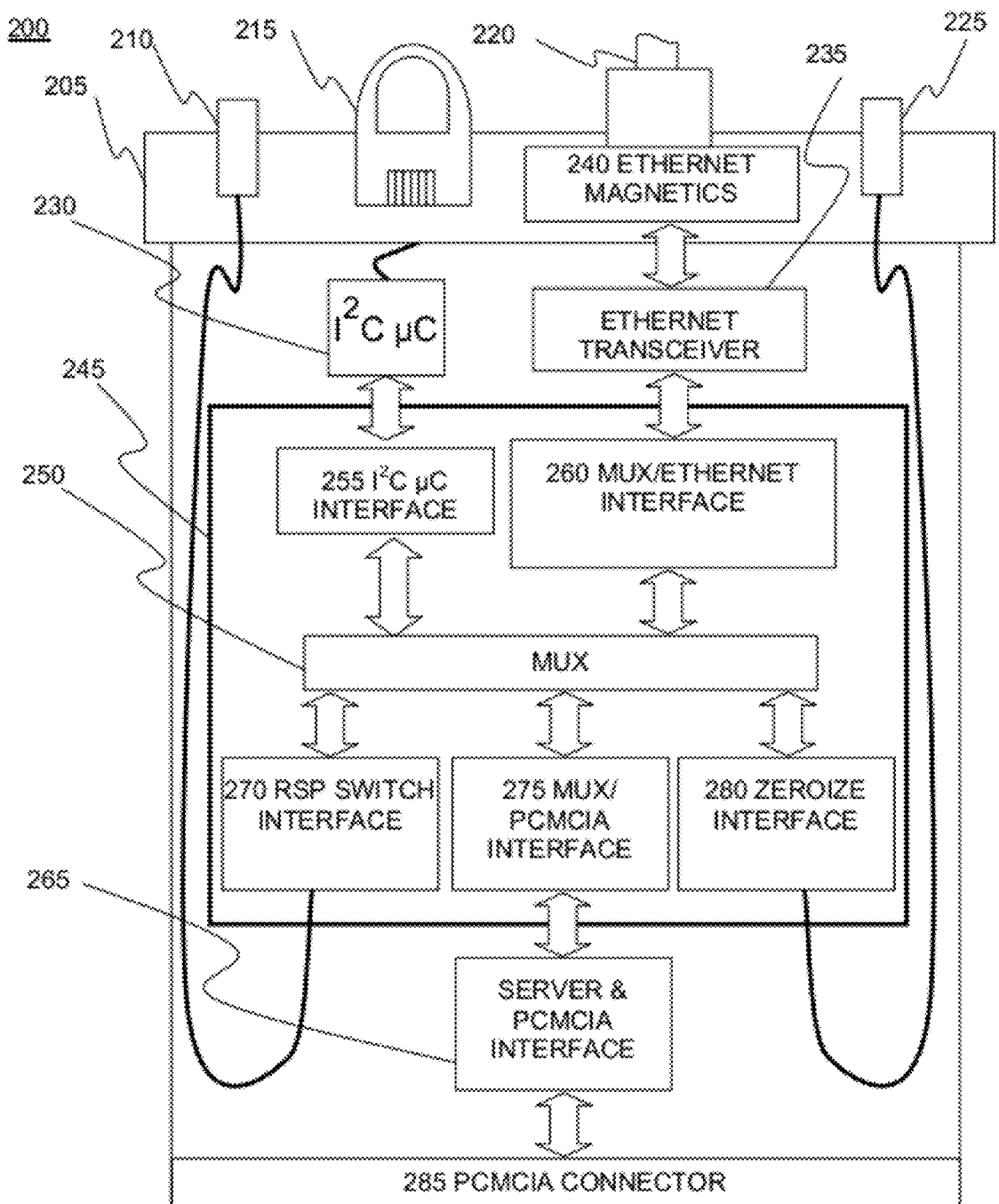
FIG. 2 is a schematic drawing showing a layout of a PCMCIA controller configured in accordance with one embodiment of the present invention.

FIG. 2 depicts a schematic drawing showing a layout of PCMCIA controller 200. The expansion card comprises external component housing/substrate 205; RSP response push-button 210, crypto ignition key (CIK) (e.g. Datakey IIT series) 215; Ethernet cable to network interface unit (NIU) 220; zeroize dual action switch 225; I²C μC (e.g. Freescale MC9S08) 230; 10/100 BaseT Ethernet transceiver IC (e.g. Phyter DP83848) 235; Ethernet magnetics 240; Field-Programmable Gate Array (FPGA) 245; multiplexer 250, assuring data field separation, (identical to GMR design in embodiments); I²C μC microcontroller interface 255; multiplexer/Ethernet interface 260; microprocessor with Ethernet server and PCMCIA interface 265; RSP switch interface 270; multiplexer/controller interface 275; zeroize interface 280; and PCMCIA connector 285.

Figure 3:
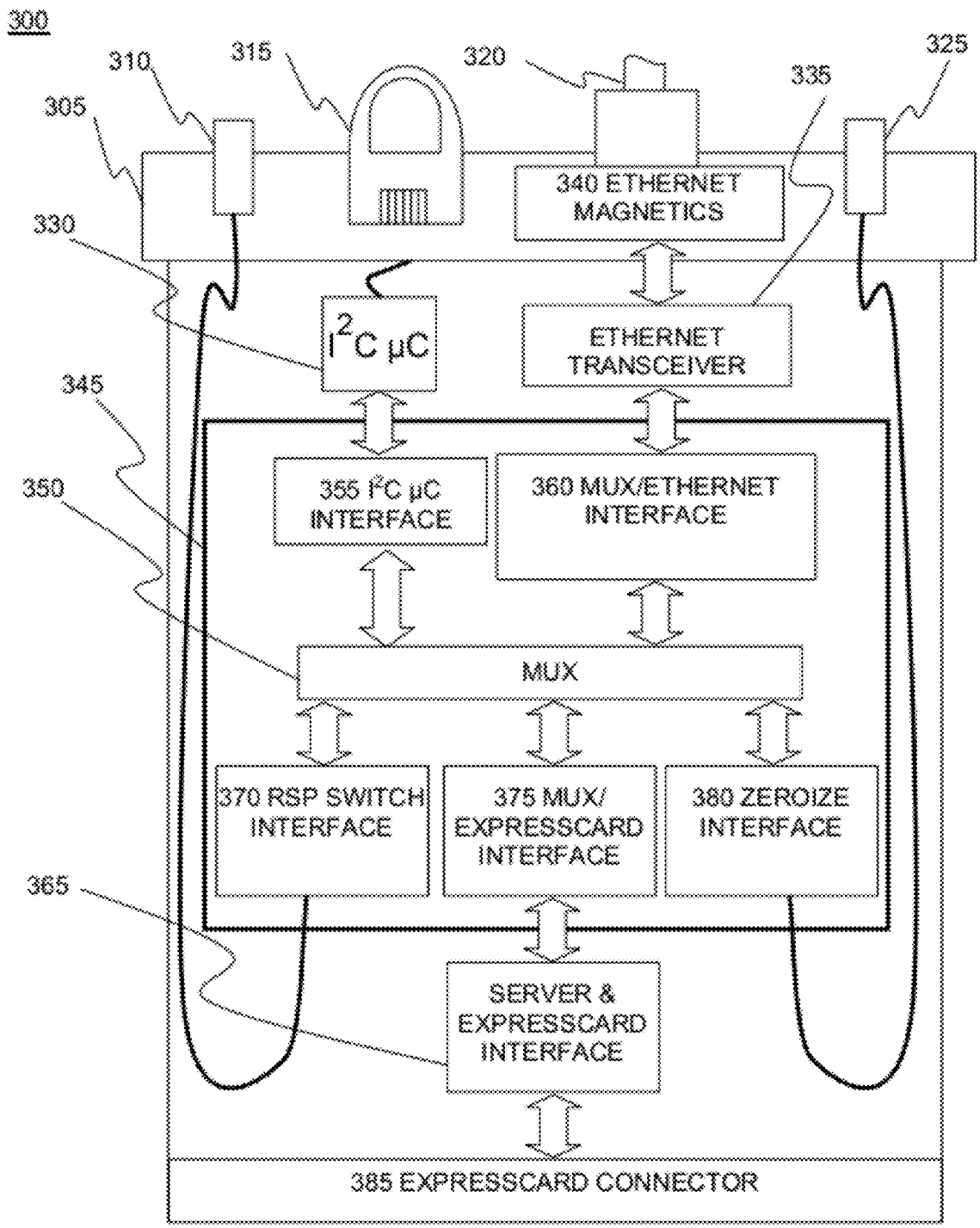
FIG. 3 is a schematic drawing showing a layout of an ExpressCard controller configured in accordance with one embodiment of the present invention.

FIG. 3 depicts a schematic drawing showing a layout of ExpressCard controller 300. The expansion card comprises external component housing/substrate 305; RSP response push-button 310, crypto ignition key (CIK) (e.g. Datakey IIT series) 315; Ethernet cable to network interface unit (NIU) 320; zeroize dual action switch 325; I²C μC (e.g. Freescale MC9S08) 330; 10/100 BaseT Ethernet transceiver IC (e.g. Phyter DP83848) 335; Ethernet magnetics 340; Field-Programmable Gate Array (FPGA) 345; multiplexer 350, assuring data field separation, and is identical to GMR design in embodiments; I²C μC interface 355; multiplexer/Ethernet interface 360; microprocessor with Ethernet server and USB interface for ExpressCard 365; RSP switch interface 370; multiplexer/controller interface 375; zeroize interface 380; and ExpressCard connector 385.

Figure 4:
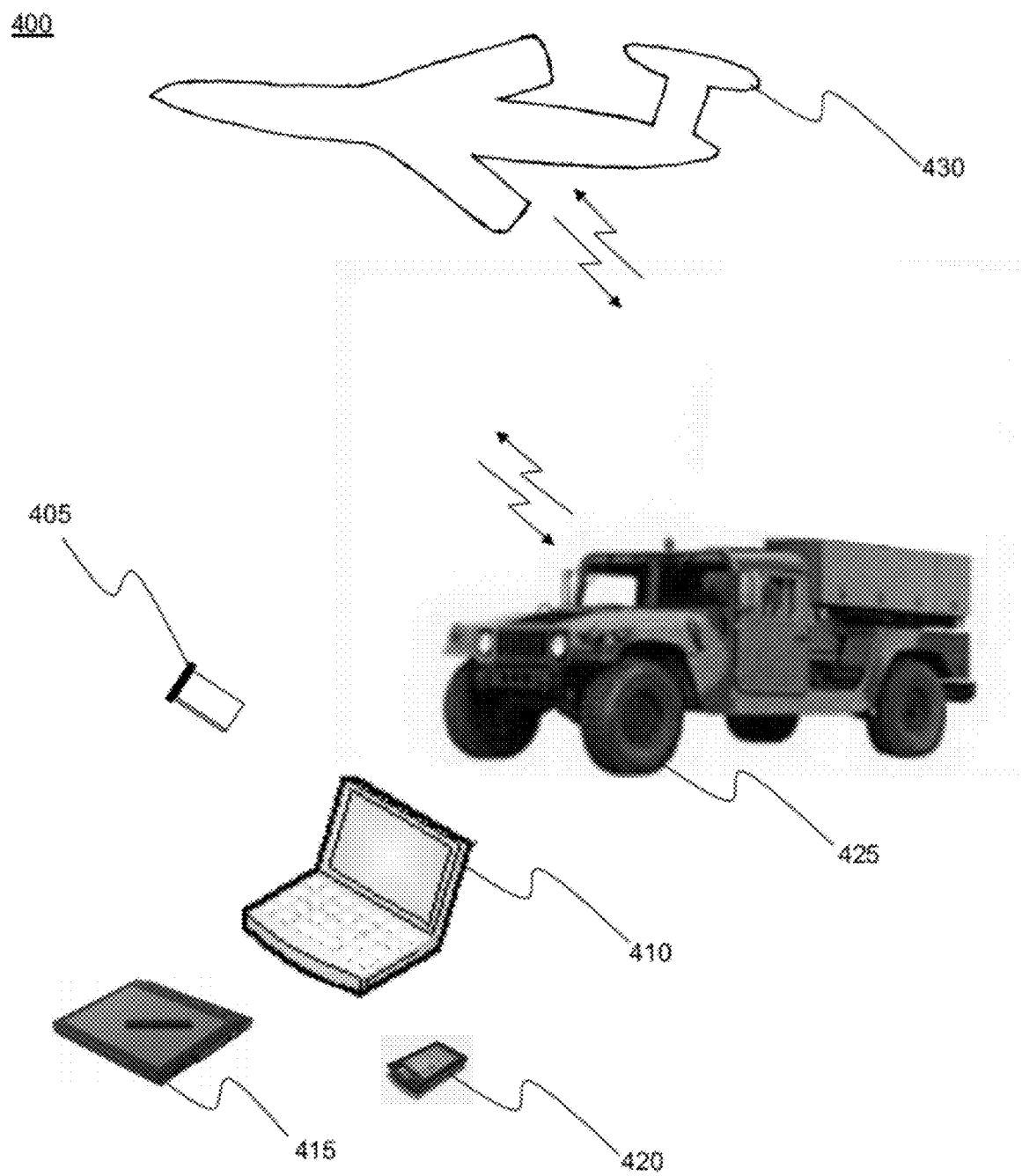
FIG. 4 depicts a radio controller system environment configured in accordance with one embodiment of the present invention.

FIG. 4 depicts a radio controller system environment 400. Embodiments of the system comprise expansion controller card 405; operable with laptop 410; tablet computer 415; a PDA with an expansion slot such as a PCDD 420; and High Mobility Multipurpose Wheeled Vehicle (HMMWV) 425. Ground operations can also communicate with airborne platforms 430.

Figure 5:
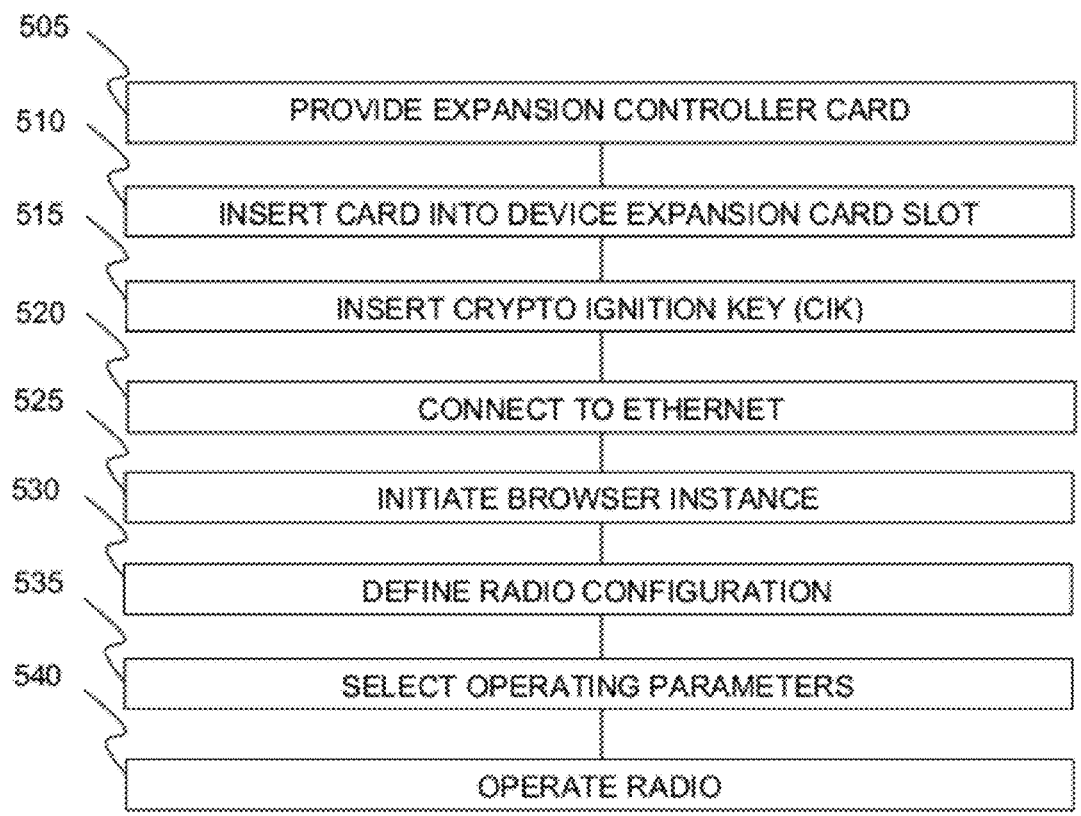
FIG. 5 depicts a flowchart for a method for controlling a radio system configured in accordance with one embodiment of the present invention.

FIG. 5 depicts a flowchart 500 for a method for controlling Ground Mobile Radio (GMR) radios. The method comprises the steps of: providing expansion controller card 505; inserting card into device expansion card slot 510; inserting Crypto Ignition Key (CIK) 515; connecting Ethernet 520; initiating browser instance 525; defining radio configuration 530; selecting operating parameters 535; and operating radio 540. For embodiments, once the Ethernet is connected, the PCDD is communicating with the radio (even before the computer browser is set up). In embodiments, without the CIK being installed, the radio will not work.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. An expansion card device for controlling a radio system comprising:
   a substrate;
   an expansion controller card interface connector on said substrate for insertion in a radio controller;
   an encryption Crypto Ignition Key (CIK) interface component on said substrate;
   a zeroize control component on said substrate;
   an Ethernet interface component on said substrate;
   an Ethernet magnetics component on said substrate, in communication with said Ethernet interface component;
   an Ethernet transceiver component on said substrate, interfaced with said Ethernet magnetics component;
   a server and interface microprocessor component on said substrate, in communication with said expansion card interface connector;
   a Field-Programmable Gate Array (FPGA) on said substrate;
   a multiplexer on said FPGA;
   a multiplexer/expansion card interface connector interface component within said FPGA, in communication with said multiplexer and said server and interface microprocessor component;
   a zeroize control interface component within said FPGA in communication with said zeroize control component and said multiplexer; and
   a multiplexer/Ethernet interface component within said FPGA, in communication with said Ethernet transceiver component and said multiplexer.

2. The device of claim 1, wherein said expansion controller card interface connector is a Personal Computer Memory Card International Association (PCMCIA) connector, and said server and interface microprocessor component is a PCMCIA interface.

3. The device of claim 1, wherein said expansion controller card interface connector is an ExpressCard connector, and said server and interface microprocessor component is an ExpressCard interface.

4. The device of claim 3, wherein a radio controller is a Panasonic Toughbook 31.

5. The device of claim 2, wherein a radio controller is a General Dynamics SDU11-3.

6. The device of claim 1, wherein said Ethernet transceiver comprises a Phyter DP83848.

7. The device of claim 1, wherein an I2C microcontroller comprises a Freescale MC9S08.

8. The device of claim 1, wherein said CIK comprises a Datakey IIT series serial memory token interface.

9. The device of claim 1, wherein said expansion controller card provides required hardware and software necessary to control a ground mobile radio (GMR).

10. The device of claim 1, further comprising a Red Switch Processor (RSP) Acknowledgement button on said substrate;

an Inter-Integrated Circuit (I2C) microcontroller (I2C μC) component on said substrate, in communication with said Crypto Ignition key interface component;

a Red Switch Policy response control (RSP) interface component within said FPGA in communication with said response control component and said multiplexer; and an I2C μC interface component within said FPGA in communication with said I2C μC component and said multiplexer;

whereby separation of hardware functionality embodied in said RSP acknowledgement, said zeroize switch and said multiplexer provides all security for said radio system.

11. The device of claim 1, wherein a radio controller comprises a laptop computer or a tablet computer.

12. The device of claim 1, wherein a radio controller comprises a personal digital assistant (PDA).

13. The device of claim 1, wherein a radio controller comprises at least one ground mobile radio (GMR) platform computer.

14. The device of claim 1, wherein said multiplexer comprises a High Assurance Multiplexer (HAMUX).

15. A method for controlling a radio system comprising the steps of:
providing at least one expansion controller card;
said card comprising
a substrate;
an expansion controller card interface connector on said substrate for insertion in a radio controller;
an encryption Crypto Ignition Key (CIK) interface component on said substrate;
a zeroize control component on said substrate;
an Ethernet interface component on said substrate;
an Ethernet magnetics component on said substrate, in communication with said Ethernet interface component;
an Ethernet transceiver component on said substrate, interfaced with said Ethernet magnetics component;
a server and interface microprocessor component on said substrate, in communication with said expansion card interface connector;
a Field-Programmable Gate Array (FPGA) on said substrate;
a multiplexer on said FPGA;
a multiplexer/expansion card interface connector interface component within said FPGA, in communication with said multiplexer and said server and interface microprocessor component;
a zeroize control interface component within said FPGA in communication with said zeroize control component and said multiplexer;
a multiplexer/Ethernet interface component within said FPGA, in communication with said Ethernet transceiver component and said multiplexer;
configuring said card for a receiving device;
inserting said card into expansion card slot of said receiving device;
inserting a Crypto Ignition Key (CIK) into said card;
initiating a browser instance on said device;
defining a radio configuration on said device by said card;
selecting radio operating parameters for said configuration; and
operating a radio of said radio system controlled by said card and said receiving device.

16. The method of claim 15, wherein said step of providing comprises selecting a type of said expansion controller card from a Personal Computer Memory Card International Association (PCMCIA) and an ExpressCard interface.

17. The method of claim 15, wherein said method comprises controlling at least one ground mobile radio (GMR) platform computer.

18. The method of claim 15, wherein said step of inserting said expansion controller card provides required hardware and software necessary to control said GMR radio.

19. A radio system for a ground mobile radio (GMR) platform computer comprising:
an expansion card device for controlling said radio system comprising:
a substrate;
an expansion controller card interface connector on said substrate for insertion in a radio controller;
a Datakey IIT series serial memory token Crypto Ignition Key (CIK) interface component on said substrate;
a Red Switch Policy (RSP) Acknowledgement button control component on said substrate;
a zeroize control component on said substrate;
an Ethernet interface component on said substrate;
an Ethernet magnetics component on said substrate, in communication with said Ethernet interface component;
a Phyter DP83848 Ethernet transceiver component on said substrate, interfaced with said Ethernet magnetics component;
a Freescale MC9S08 Inter-Integrated Circuit (I2C) microcontroller (I2C μC) component on said substrate, in communication with said encryption key interface component;
a server and interface microprocessor component on said substrate, in communication with said expansion card interface connector;
a Field-Programmable Gate Array (FPGA) on said substrate;
a multiplexer on said FPGA;
a multiplexer/expansion card interface connector interface component within said FPGA, in communication with said multiplexer and said server and interface microprocessor component;
a Red Switch Policy control (RSP) interface component within said FPGA in communication with said response control component and said multiplexer;
a zeroize control interface component within said FPGA in communication with said zeroize control component and said multiplexer;
an I2C μC interface component within said FPGA in communication with said I2C μC component and said multiplexer;
a multiplexer/Ethernet interface component within said FPGA, in communication with said Ethernet transceiver component and said multiplexer;
whereby separation of hardware functionality embodied in said RSP acknowledgement, said zeroize switch and said multiplexer provides all security for said radio system.

* * * * *